United States Patent
Won et al.

(10) Patent No.: US 7,358,694 B2
(45) Date of Patent: Apr. 15, 2008

(54) APPARATUS AND METHOD FOR DETERMINING NORMAL START UP OF SENSORLESS MOTOR

(75) Inventors: June Hee Won, Seoul (KR); Dal Ho Cheong, Seoul (KR); Jae Yoon Oh, Kyungki-do (KR)

(73) Assignee: LG Electronics Inc., Seoul (KR)

(*) Notice: Subject to any disclaimer, the term of this patent is extended or adjusted under 35 U.S.C. 154(b) by 205 days.

(21) Appl. No.: 11/368,665

(22) Filed: Mar. 7, 2006

(65) Prior Publication Data

US 2006/0201726 A1   Sep. 14, 2006

(30) Foreign Application Priority Data

Mar. 8, 2005   (KR) ............... 10-2005-0019140

(51) Int. Cl.
*H02P 1/04* (2006.01)

(52) U.S. Cl. ............... 318/254; 318/138; 318/439; 318/806; 318/798; 318/727

(58) Field of Classification Search ............... 318/254, 318/138, 439, 806, 798, 727
See application file for complete search history.

(56) References Cited

U.S. PATENT DOCUMENTS

| | | | | |
|---|---|---|---|---|
| 5,051,680 A | * | 9/1991 | Belanger | 318/701 |
| 5,397,971 A | * | 3/1995 | McAllister et al. | 318/254 |
| 5,969,496 A | * | 10/1999 | Yamada et al. | 318/715 |
| 6,163,127 A | * | 12/2000 | Patel et al. | 318/700 |
| 6,281,656 B1 | * | 8/2001 | Masaki et al. | 318/700 |
| 6,501,243 B1 | * | 12/2002 | Kaneko et al. | 318/700 |
| 6,586,903 B2 | * | 7/2003 | Moriarty | 318/701 |
| 6,696,812 B2 | * | 2/2004 | Kaneko et al. | 318/700 |
| 6,815,924 B1 | * | 11/2004 | Iura et al. | 318/727 |
| 7,095,195 B2 | * | 8/2006 | Tagome et al. | 318/268 |
| 2001/0002784 A1 | * | 6/2001 | Masaki et al. | 318/727 |

* cited by examiner

*Primary Examiner*—Rita Leykin
(74) *Attorney, Agent, or Firm*—Greenblum & Bernstein, P.L.C.

(57) ABSTRACT

An apparatus and method determine a start-up of a sensorless motor. The apparatus includes an elapsed time determination unit, a motor velocity determination unit and an abnormal start-up determination unit. The elapsed time determination unit determines whether a predetermined time has elapsed after a start-up of the motor is initiated. The motor velocity determination unit determines whether a velocity of the motor exceeds a predetermined velocity value when the predetermined time has elapsed. The abnormal start-up determination unit determines that the motor was abnormally started up when the velocity of the motor does not exceed the predetermined value, and an amount of current flowing in the motor does not exceed a predetermined current value.

20 Claims, 5 Drawing Sheets

APPARATUS AND METHOD FOR DETERMINING NORMAL START UP OF SENSORLESS MOTOR

CROSS-REFERENCE TO RELATED APPLICATIONS

The present disclosure relates to subject matter contained in priority Korean Application No. 2005-19140, filed on Mar. 8, 2005, which is herein expressly incorporated by reference in its entirety.

BACKGROUND OF THE INVENTION

1. Field of the Invention

The present invention relates to an apparatus and method for determining a start up of a sensorless motor, and more particularly to an apparatus and method for determining a start-up of a sensorless motor with no sensor attached thereto, wherein, even when position estimation of the motor fails, a determination is made as to whether the motor has been normally started up, using a velocity of the motor, a voltage and current applied to the motor, etc., when a predetermined time has elapsed after the motor was started up.

2. Description of the Related Art

FIG. 1 is a block diagram showing the construction of a general inverter driver with a motor.

An inverter is an electric power apparatus for varying a frequency in order to drive a motor at any velocity. The inverter generally includes, as shown in FIG. 1, a power module which is modularized with a power device, a gate circuit and an overcurrent protection circuit.

Meanwhile, an inverter induction machine generally employs a voltage/frequency (V/F) control method of an open loop type with no position and velocity estimation due to characteristics thereof. The overcurrent protection circuit which is arranged in the power device is used as a protection module for the inverter induction machine.

However, since the overcurrent protection circuit aims to protect the power device, it may operate at a very high operating level at which relatively high current flows to the circuit, resulting in damage to the motor.

That is, higher current than a withstand voltage characteristic of the motor may flow in the motor even though it is below the operating level of the protection circuit. In such a case, the motor may be damaged. Particularly, when the motor fails to be started up, it is difficult to determine the start-up failure without performing the velocity estimation because of characteristics of the motor.

In order to resolve the above problem, the operating level of the overcurrent protection circuit may be lowered below a predetermined value. In this case, however, even when current flowing in the motor is normal, it may be determined to be higher than the operating level of the protection circuit, thereby causing the operation of the power device to be stopped.

Thus, there is a need for an additional protection circuit for protecting not the power device, but the motor.

In the case where the above motor is a sensorless motor with no sensor attached thereto, a voltage is applied in an open loop state using the V/F control method under the condition that the position and velocity thereof are not detected. For this reason, even though the motor fails to be started up, it may not be possible to determine whether the amount of current flowing in the motor is excessive or not, which may lead to damage to the motor.

SUMMARY OF THE INVENTION

Therefore, the present invention has been made in view of the above problems, and it is an object of an embodiment of the present invention to provide an apparatus and method for determining a normal start-up of a sensorless motor, whereby, when start-up of the sensorless motor is initially attempted, it is possible to determine whether the motor has been normally started up. This determination may be made regardless of whether the position estimation of the motor is performed correctly or incorrectly.

In accordance with an aspect of the present invention, an apparatus is provided for determining a normal start-up of a sensorless motor, the apparatus comprising: an elapsed time determination unit or timer for determining whether a predetermined time has elapsed after the motor has started up; a motor velocity determination unit or determiner for determining whether a velocity of the motor is above a predetermined velocity value when the predetermined time has elapsed after the motor was initially started up; and an abnormal start-up determination unit or determiner for determining that the motor was abnormally started up through comparison of a predetermined current value with the amount of current flowing in the motor, e.g., determined by a current value determination unit or determiner, when the velocity of the motor does not exceed the predetermined velocity value, and judging that the motor has been abnormally started up when the amount of current does not exceed the predetermined current value.

In accordance with another aspect of the present invention there is provided a method for determining a start-up of a sensorless motor, the method includes the steps of: a) determining whether a predetermined time has elapsed after the motor is initially started up; b) determining whether a velocity of the motor exceeds a predetermined velocity value when the predetermined time has elapsed; c) determining whether a current flowing in the motor exceeds a predetermined current value when the velocity of the motor does not the predetermined velocity value; and d) judging that the motor has been abnormally started up when the current flowing in the motor exceeds the predetermined current value.

In a feature of the present invention, after the motor has been normally started up when a predetermined time has elapsed, a velocity of the motor, a voltage and current applied to the motor, respectively, are compared with the predetermined values determined, for example, by experiments. Therefore, it is possible to determine whether the motor is normally started up regardless of whether a position estimation of the motor is performed correctly or incorrectly.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Now, various embodiments of the present invention will be described in detail with reference to the annexed drawings.

Figure 1:
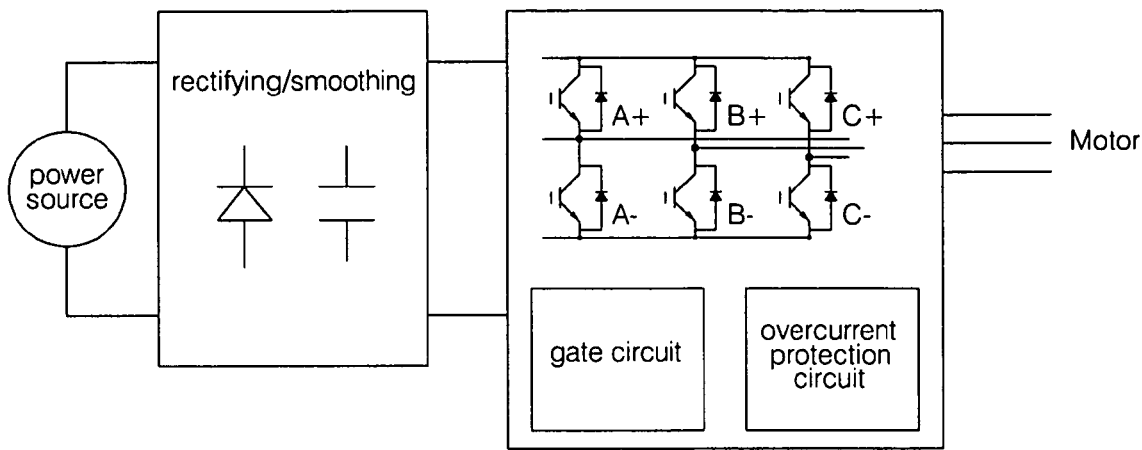
FIG. 1 is a block diagram showing the construction of a general inverter driver with a motor in the prior art.
Figure 2:
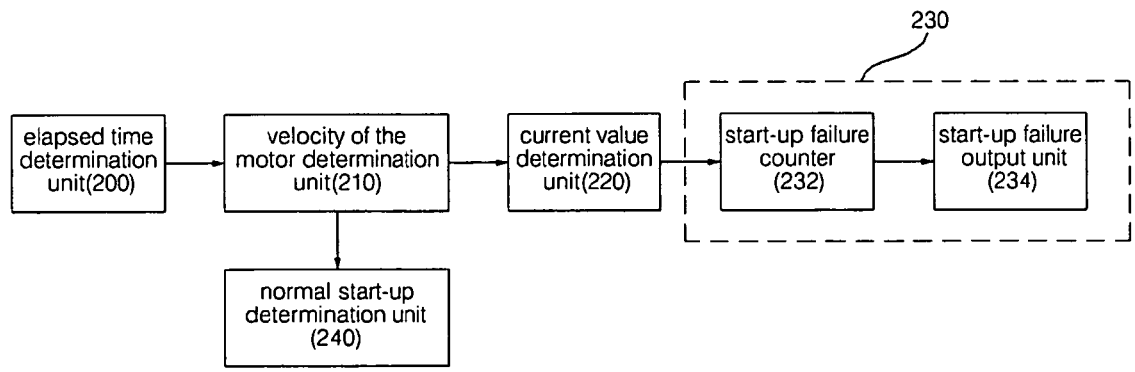
FIG. 2 is a block diagram showing the construction of an apparatus for determining a start-up of a sensorless motor according to an exemplary embodiment of the present invention.

FIG. 2 is a block diagram showing the construction of an apparatus for determining a start-up of a sensorless motor according to an exemplary embodiment of the present invention. As shown in FIG. 2, the motor start-up determining apparatus according to the exemplary embodiment of the present invention includes an elapsed time determination unit 200, a motor velocity determination unit 210, a current value determination unit 220, an abnormal start-up determination unit 230, and a normal start-up determination unit 240.

The elapsed time determination unit 200 determines whether a predetermined time has elapsed after the motor was started up. The motor velocity determination unit 210 determines whether the velocity of the motor exceeds a predetermined velocity value when the predetermined time has elapsed. The reason for the determination originates from the fact that, if the motor has been normally started up, the velocity of the motor arrives at the predetermined value under the condition that the amount of current flowing in the motor does not exceed a predetermined current value when the predetermined time has elapsed after the motor was started up.

Figure 3:
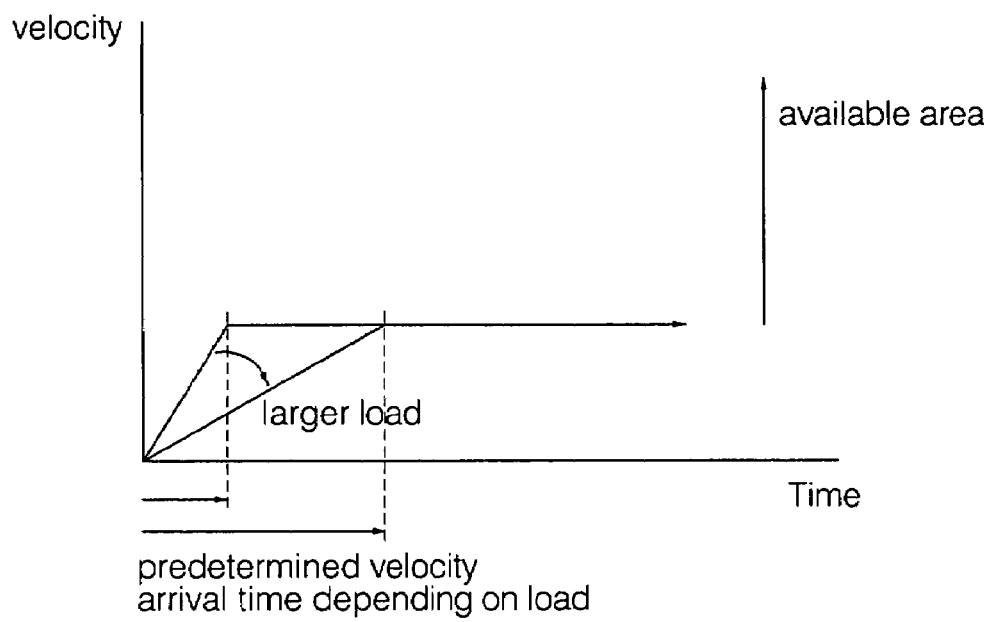
FIG. 3 is a view illustrating a general start-up characteristic of a motor according to the present invention.

FIG. 3 is a view illustrating a general start-up characteristic of a motor according to the present invention. In the motor according to the present invention, a starting point of a motor velocity area available for most loads is not determined in relation to the value of zero, but is determined above a predetermined velocity depending on the loads. For example, in the case of a load of a compressor motor used in an air conditioner, etc., because it is accelerated over a predetermined velocity after a start-up and is performed only once, an area below the predetermined velocity exists only at a transition state for an initial acceleration. In the load with such a characteristic, if the compressor motor is in a normal state, the maximum acceleration time of the motor and the maximum current required in the motor may be defined as predetermined values, respectively.

Therefore, the apparatus for determining a start-up of the motor according to the present invention may determine whether the velocity of the motor arrives at the predetermined velocity value under the condition that current flowing in the motor does not exceed a predetermined current value when the predetermined time has elapsed after the motor was started up, thereby determining whether the start-up of the motor has succeeded or not.

The current value determination unit or determiner 220 determines whether the current flowing in the motor exceeds a predetermined current value when the velocity of the motor does not exceed the predetermined velocity value. The predetermined current and the predetermined time may be determined emperically, through experimentation, for example. That is, they may be acquired by measuring an arrival time at the predetermined velocity, when the maximum load is applied to the motor, the maximum load being acceptable within an allowable range of the maximum current of the motor.

The abnormal start-up determination unit 230 may include a start-up failure counter 232 and a start-up failure output unit or indicator 234. In an embodiment, the abnormal start-up determination unit 230 judges that the motor has been abnormally started up when it is determined that the current flowing in the motor exceeds the predetermined value, by a signal transmitted from the current value determination unit 220.

When it is determined that the current flowing in the motor exceeds the predetermined value, the start-up failure counter 232 can increment a start-up failure count. The start-up failure indicator 234 judges that the start-up of the motor has failed when the start-up failure count exceeds a predetermined value, and outputs an error display message externally, for example, at a monitor or other graphical user interface.

The normal start-up determination unit 240 judges that the motor has been normally started up when it is determined that the velocity of the motor exceeds the predetermined value, by a signal transmitted from the motor velocity determination unit 210.

A motor start-up determining apparatus according to another embodiment of the present invention may be used when a position estimation of the motor fails.

Figure 4:
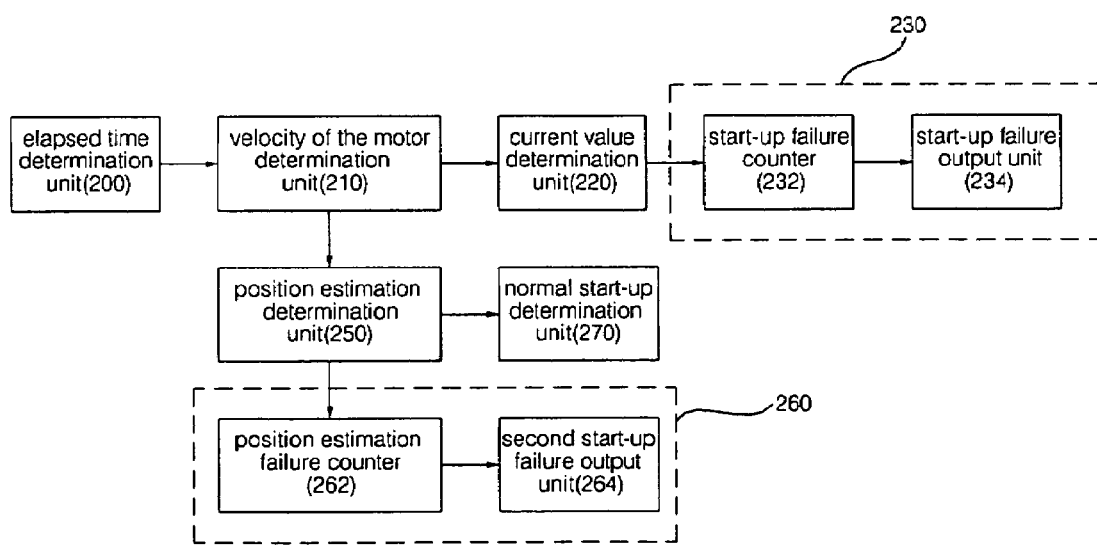
FIG. 4 is a block diagram showing the construction of an apparatus for determining a start-up of a sensorless motor even when position estimation fails, according to another embodiment of the present invention.

FIG. 4 is a block diagram showing the construction of an apparatus for determining a start-up of a sensorless motor which may be used even when a position estimation fails, according to another embodiment of the present invention.

The motor start-up determining apparatus according to this embodiment of the present invention may include an elapsed time determination unit 200, a motor velocity determination unit 210, a current value determination unit 220, a first abnormal start-up determination unit 230, a position estimation determination unit 250, a second abnormal start-up determination unit 260, and a normal start-up determination unit 270.

The explanations of the elapsed time determination unit 200, the motor velocity determination unit 210, the current value determination unit 220 and the first abnormal start-up determination unit 230 are the same as the above-mentioned explanations according to the exemplary embodiment of the present invention, and a detailed description thereof will thus not be repeated.

Referring to FIG. 4, a position estimation determination unit or determiner 250 determines whether the position estimation of the motor is correct when the velocity of the motor exceeds the predetermined velocity, by a signal transmitted from the velocity of the motor determination unit 210.

The determination of whether the position estimation is correct, may be performed by determining whether a voltage applied to the motor exceeds a predetermined value. That is, when the voltage applied to the motor exceeds the predetermined value, it may be determined that the position estimation of the motor is correct.

Figure 5:
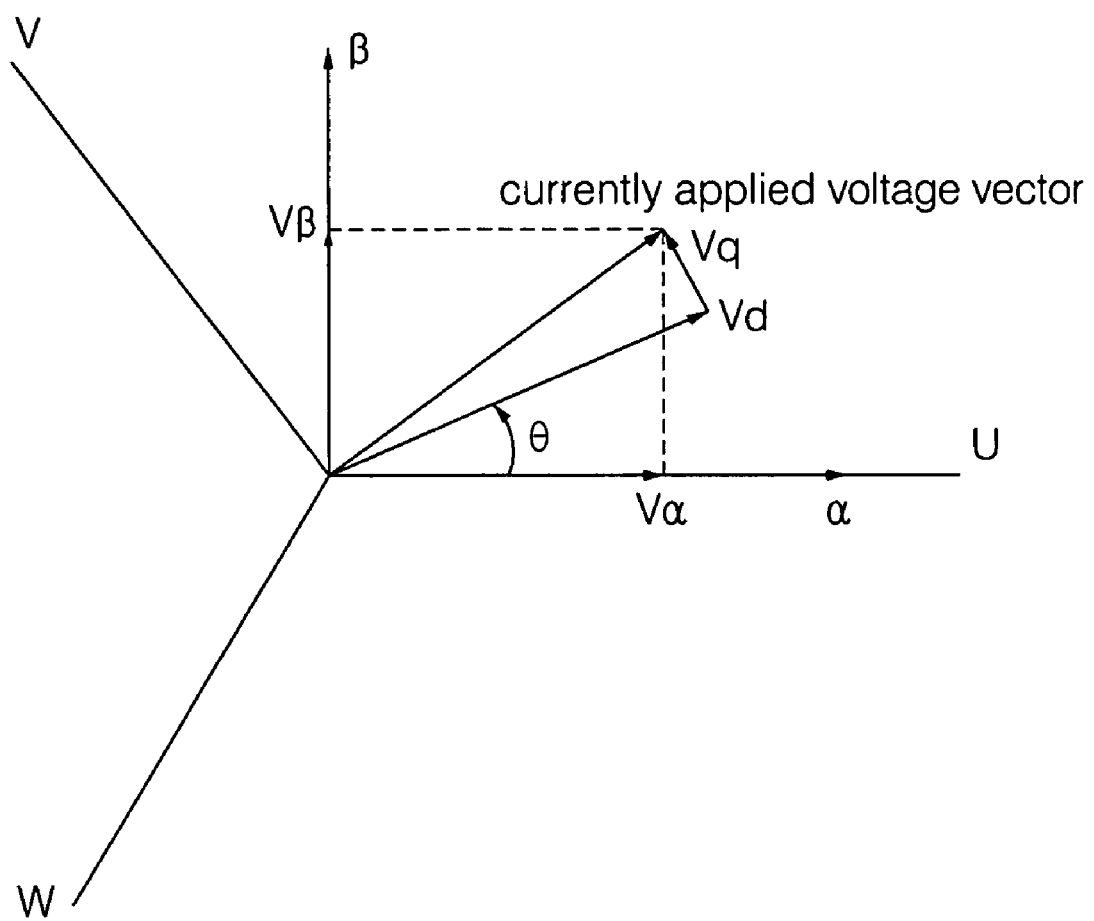
FIG. 5 is a view illustrating a general voltage vector of a motor according to the present invention.

FIG. 5 is a view illustrating a general voltage vector of a motor according to the present invention.

In the sensorless motor according to the present invention, it is possible to estimate the voltage applied to the motor. That is, because a voltage in a fixed coordinate system can be calculated again from a PWM duty, the voltage applied to the motor may be estimated without regard to accuracy of the estimated position.

For example, as shown in FIG. 5, because respective U, V and W voltage phases can be calculated again from the PWM duty applied currently to the motor, the voltage $V_{\alpha\beta}$ in the fixed coordinate system may be acquired.

However, in a rotary coordinate system, an estimated position of the motor is required in order to acquire an estimated voltage. Referring to FIG. 5, because there is a need for a value of a position signal θ in order to acquire the voltage $V_{dq}$ in the rotary coordinate system, it is difficult, when the position estimation fails, to estimate the voltage.

In order to acquire the voltage |V| applied to the motor, a voltage vector may be used. Referring to FIG. 5, in the case of using the voltage $V_{\alpha\beta}$ in the fixed coordinate system, the voltage |V| applied to the motor can be acquired using the following equation.

$$|V|=\sqrt{V_\alpha^2+V_\beta^2}$$ [Equation 1]

Meanwhile, the second abnormal start-up determination unit 260 includes a position estimation failure counter 262 and the second start-up failure indicator 264. When the position estimation of the motor is incorrect, the second abnormal start-up determination unit 260 judges that the motor has been abnormally started up.

The position estimation failure counter 262 can increment a position estimation failure count when the position estimation of the motor is incorrect.

The second start-up failure indicator 264 determines that the start-up of the motor has failed when the position estimation failure count exceeds a predetermined value, and outputs an error display message externally.

In addition, the normal start-up determination unit 270 judges that the motor has been normally started up when the position estimation of the motor is correct.

Figure 6:
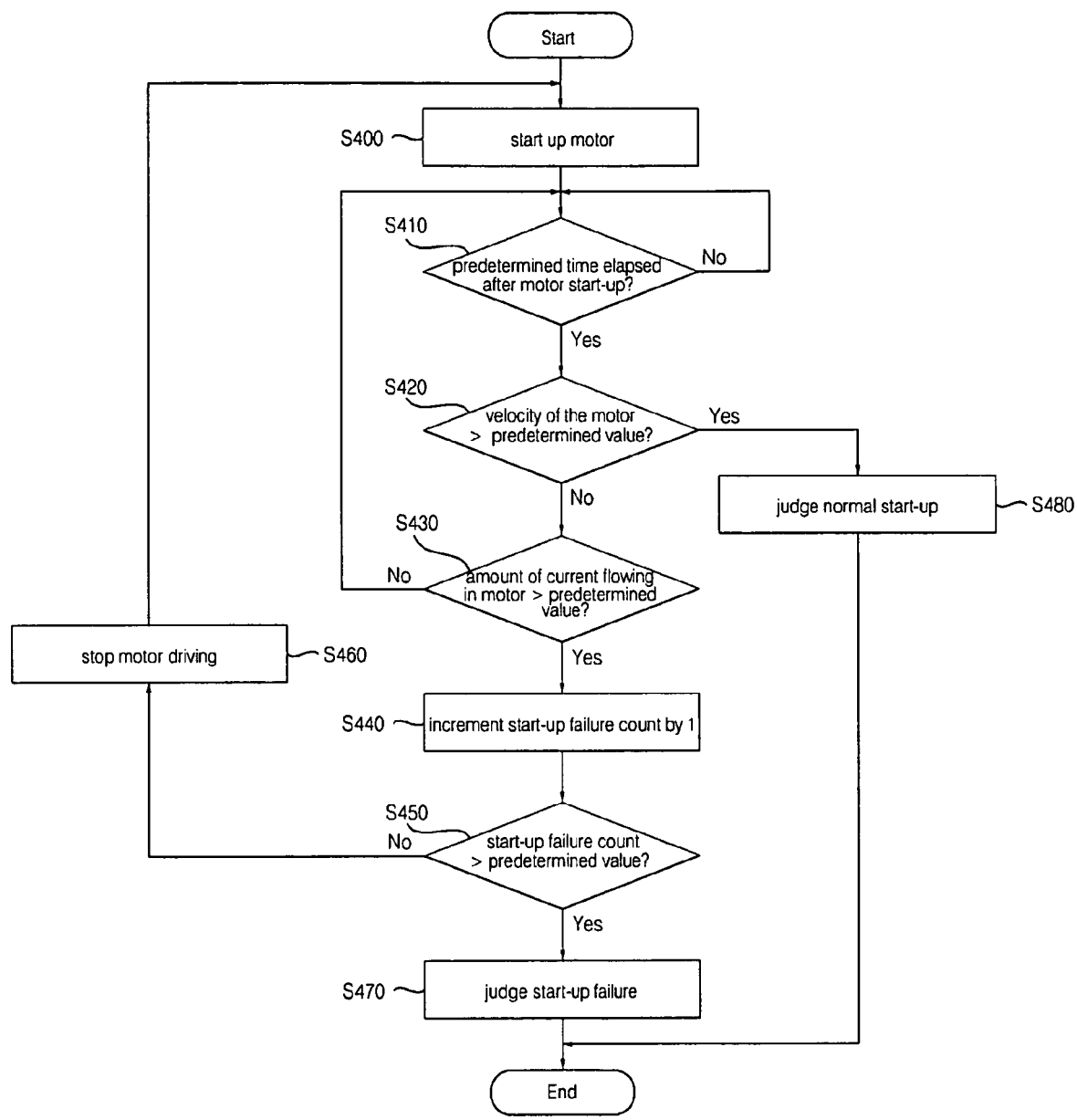
FIG. 6 is a flowchart illustrating a method for determining a start-up of a sensorless motor according to an exemplary embodiment of the present invention.

FIG. 6 is a flowchart illustrating a method for determining a start-up of a sensorless motor according to an exemplary embodiment of the present invention. The motor start-up determination method of FIG. 6 will be explained with reference to the above FIG. 2.

To begin with, a start-up attempt of the motor is initiated (S400). When the motor is started, the elapsed time determination unit 200 determines whether the motor has been started up for a predetermined time (S410).

According to the determination result, the velocity of the motor determination unit 210 detects a velocity of the motor, and determines whether the detected velocity exceeds a predetermined velocity (S420). When the detected velocity exceeds a predetermined velocity, the normal start-up determination unit 240 judges that the motor has been normally started up (S480), and procedures for determining whether the motor has been normally started up are ended.

If the velocity of the motor does not arrive at the predetermined velocity even when the predetermined time has elapsed, the current value determination unit 220 determines whether current flowing in the motor exceeds a predetermined value (S430).

According to the determination result, when the current flowing in the motor does not exceed the predetermined value, because it is not possible to determine whether the motor has been abnormally started up, the above procedures for determining the normal start-up of the motor are repeated.

When the current flowing in the motor exceeds the predetermined value, the start-up failure counter 232 can increment a start-up failure count by 1 (S440). The start-up failure counter 232 also determines whether the start-up failure count exceeds a predetermined value (S450), judges that the start-up of the motor has failed when it is determined that the start-up failure count exceeds the predetermined value (S470), and outputs an error display message externally by way of the start-up failure indicator (234).

When the start-up failure count does not exceed the predetermined value, a drive of the motor is stopped (S460), and then the above procedures for determining the normal start-up of the motor are repeated, beginning with S400.

Figure 7:
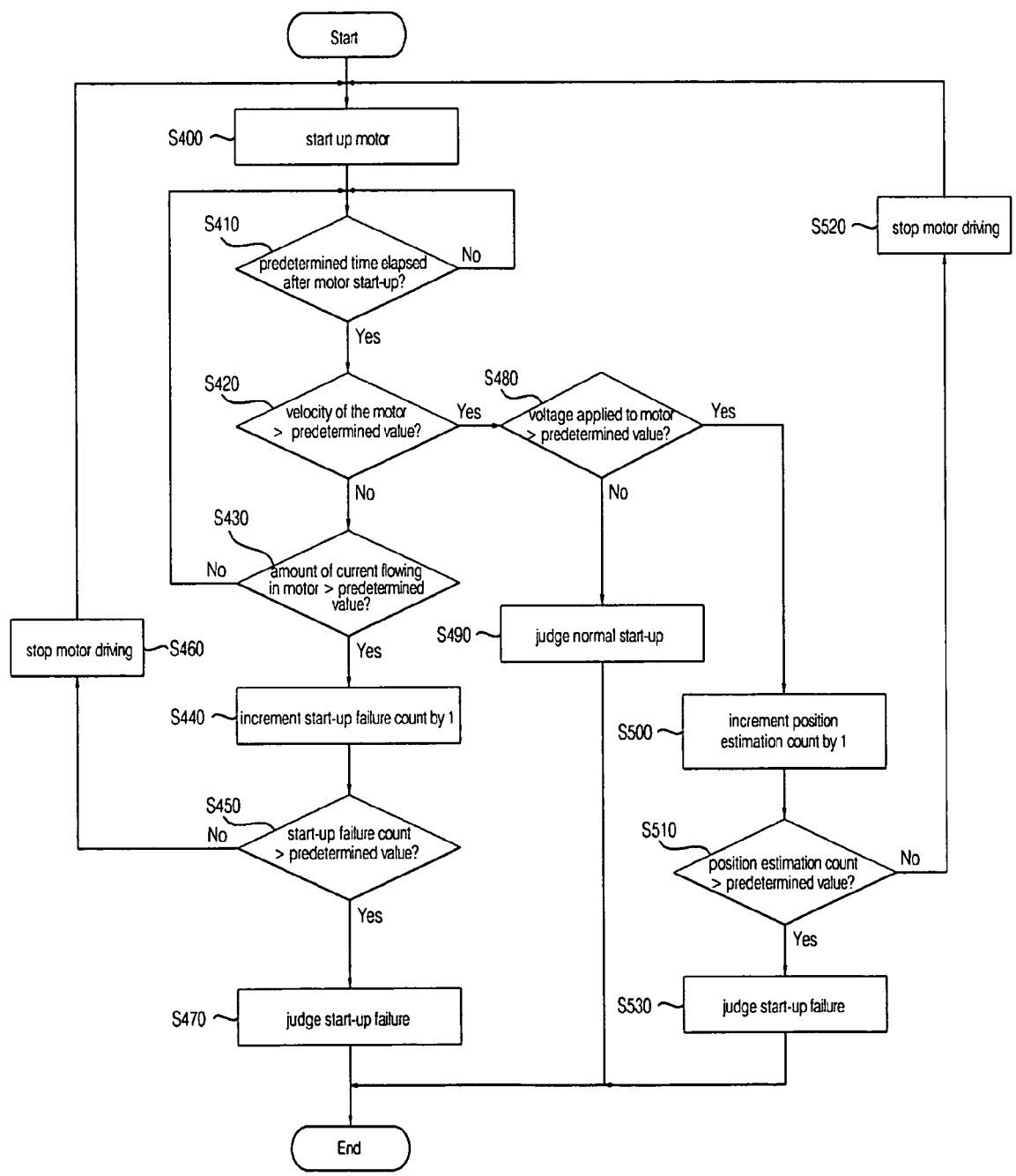
FIG. 7 is a flowchart illustrating a method for determining a start-up of a sensorless motor even when position estimation fails, according to another embodiment of the present invention.

Referring to FIG. 4 and FIG. 7, a method for determining a start-up of the sensorless motor according to another embodiment of the present invention will be explained in the following. FIG. 7 is a flowchart illustrating a method for determining a start-up of a sensorless motor which may be used even though a position estimation fails, according to another embodiment of the present invention.

The motor start-up determination method according to another embodiment of the present invention is similar to the above embodiment of the present invention except that the position estimation fails, and a detailed description of the similar aspects (e.g., S400, S410, S420, S430, S440, S450, S460, and S470) will thus not be repeated in detail.

Upon start-up, it is determined whether a predetermined time has elapsed at a predetermined period time when the motor was started up, and then it is determined whether a velocity of the motor exceeds a predetermined velocity when the predetermined time has elapsed (S400 to S420).

When the velocity of the motor exceeds a predetermined velocity after the predetermined time has elapsed, the position estimation determination unit 250 determines whether a voltage applied to the motor exceeds a predetermined voltage (S480). According to the determination result, when the voltage applied to the motor exceeds the predetermined voltage, the normal start-up determination unit 270 concludes that the motor has been normally started up, and then procedures for determining a start-up of the motor are ended (S490).

However, when the voltage applied to the motor does not exceed the predetermined voltage, the position estimation failure counter 262 can increment a position estimation failure count by 1 (S500), and determines whether the position estimation failure count exceeds a predetermined value. When the position estimation failure count exceeds the predetermined value, the second start-up failure indicator 264 determines that the start-up of the motor has failed (S530), and outputs an error display message externally, indicating an abnormal start-up. Then, procedures for determining a start-up of the motor are ended.

When the position estimation failure count does not exceed the predetermined value, a drive of the motor is stopped (S520), and the above procedures for determining the normal start-up of the motor are repeated beginning with S400.

As apparent from the above description, the present invention provides an apparatus and method for determining a start-up of a sensorless motor, wherein, in the case where the motor is a sensorless motor with no sensor attached thereto, when a predetermined time has elapsed after the motor was started up, a velocity of the motor, and a voltage and current applied to the motor, are compared with respective predetermined values acquired, for example, by experimentation. Therefore, it is possible to determine whether the motor has been normally started up regardless of whether the position estimation of the motor is correct or incorrect.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for determining a start-up of a sensorless motor, the apparatus comprising:
   a timer that determines whether a predetermined time has elapsed after a start-up of the motor is initiated;
   a motor velocity determiner that determines whether a velocity of the motor exceeds a predetermined velocity value when the predetermined time has elapsed;
   a current value determiner that determines whether a current flowing in the motor exceeds a predetermined current value when the velocity of the motor does not exceed the predetermined velocity value; and
   an abnormal start-up determiner that determines that the motor has been abnormally started up when the amount of current does not exceed the predetermined current value when the velocity of the motor does not exceed the predetermined velocity value.

2. The apparatus as set forth in claim 1, wherein the abnormal start-up determiner comprises:
   a start-up failure counter that increments a start-up failure count when it determines that the motor has been started up abnormally; and
   a start-up failure indicator that, when the incremented start-up failure count exceeds a predetermined value, determines that the start-up of the motor has failed, and outputs an error display signal.

3. The apparatus as set forth in claim 1, further comprising a normal start-up determiner that determines that the motor has been normally started up when the velocity of the motor exceeds the predetermined value.

4. The apparatus as set forth in claim 1, further comprising:
   a second abnormal start-up determiner that determines that the motor has been abnormally started up when a position estimation of the motor is incorrect.

5. The apparatus as set forth in claim 4, further comprising:
   a position estimation determiner that determines whether the position estimation of the motor is correct when the velocity of the motor exceeds the predetermined velocity value;
   wherein the normal start-up determiner determines that the motor has been normally started up when the position estimation of the motor is correct when the velocity of the motor exceeds the predetermined velocity value.

6. The apparatus as set forth in claim 5, wherein the position estimation determiner determines whether a voltage applied to the motor exceeds a predetermined voltage value, and outputs a signal to the normal start-up determination unit indicating that the position estimation of the motor is correct when the applied voltage exceeds the predetermined value.

7. The apparatus as set forth in claim 5, wherein the second abnormal start-up determiner comprises:
   a position estimation failure counter that increments a position estimation failure count when the position estimation of the motor is incorrect; and
   a second start-up failure indicator that, when the incremented position estimation failure count exceeds a predetermined value, determines that the start-up of the motor has failed, and outputs an error display signal externally.

8. A method for determining a start-up of a sensorless motor, the method comprising:
   determining whether a predetermined time has elapsed after a start-up of the motor is initiated;
   determining whether a velocity of the motor exceeds a predetermined velocity value when the predetermined time has elapsed;
   determining whether the current flowing in the motor exceeds a predetermined current value when the velocity of the motor does not exceed the predetermined velocity value; and
   judging that the motor has been abnormally started up when the current flowing in the motor exceeds the predetermined current value.

9. The method as set forth in claim 8, further comprising:
   incrementing a start-up failure count when the motor has been abnormally started up; and
   judging that the start-up of the motor has failed when the start-up failure count exceeds a predetermined value.

10. The method as set forth in claim 9, further comprising:
    outputting an error display signal indicating that the start-up of the motor has failed.

11. The method as set forth in claim 8, further comprising judging that the motor has been normally started up when the velocity of the motor exceeds the predetermined value.

12. The method as set forth in claim 8, further comprising:
    determining whether a position estimation of the motor is correct when the velocity of the motor exceeds the predetermined velocity value;
    judging that the motor has been normally started up when it is determined that the position estimation of the motor is correct; and
    judging that the motor has been abnormally started up when it is determined that the position estimation of the motor is incorrect.

13. The method as set forth in claim 12, wherein determining whether the position estimation is correct comprises determining whether a voltage applied to the motor exceeds a predetermined voltage value and, when the applied voltage exceeds the predetermined voltage value, determining that the position estimation of the motor is correct.

14. The method as set forth in claim 12, further comprising:
    incrementing a position estimation failure count when it is determined that the position estimation of the motor is incorrect; and
    judging the start-up of the motor has failed when the position estimation failure count exceeds a predetermined value.

15. The method as set forth in claim 14, further comprising:

outputting an error display signal indicating that the start-up of the motor has failed.

16. An apparatus for identifying an abnormal start-up of a sensorless motor, the apparatus comprising:

a comparer that compares an amount of current flowing in the motor when a velocity of the motor does not exceed a predetermined velocity value after a predetermined period of time after a start-up of the motor is initiated; and a start-up determiner that determines that the motor has been abnormally started up when the amount of current does not exceed a predetermined current value.

17. The apparatus as set forth in claim 16, further comprising:

a start-up failure counter that increments a start-up failure count when the determiner determines that the motor has been abnormally started up; and a start-up failure indicator that, when the incremented start-up failure count exceeds a predetermined value, determines that the start-up of the motor has failed and provides an indication of the failed start-up.

18. The apparatus as set forth in claim 16, further comprising:

a position estimator that determines whether a position estimation of the motor is correct when the velocity of the motor exceeds the predetermined velocity value within the predetermined period of time; and a second start-up determiner that determines that the motor has been abnormally started up when the position estimation of the motor is not correct.

19. The apparatus as set forth in claim 18, wherein the position estimator determines that the position estimation of the motor is correct when a voltage applied to the motor exceeds a predetermined voltage value.

20. The apparatus as set forth in claim 19, wherein the second start-up determiner comprises:

a position estimation failure counter for incrementing a position estimation failure count when the position estimation of the motor is incorrect; and a second start-up failure indicator that, when the incremented position estimation failure count exceeds a predetermined value, determines that the start-up of the motor has failed and provides an indication of the failed start-up.

* * * * *